Patented Mar. 19, 1946

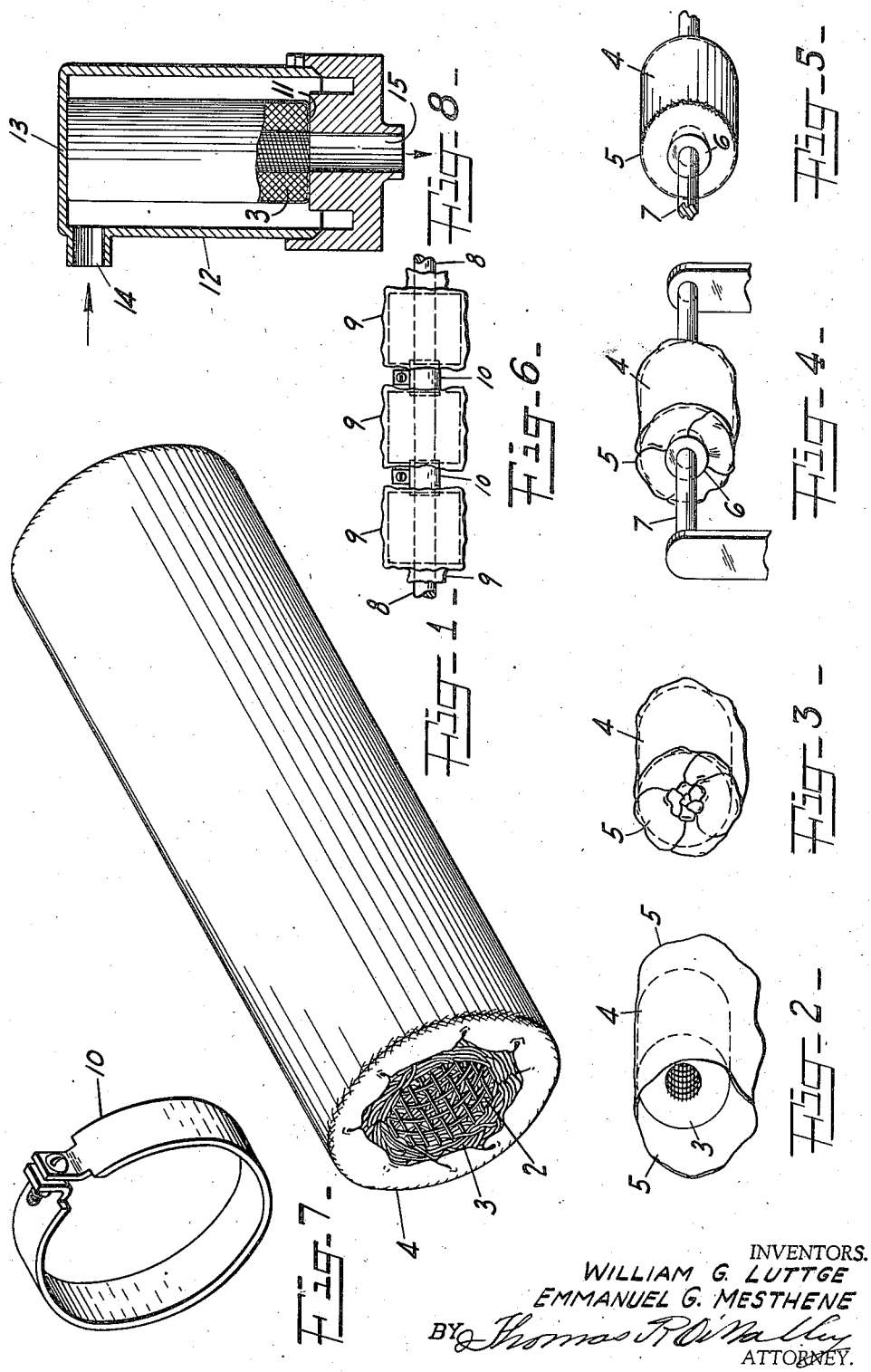

2,396,712

UNITED STATES PATENT OFFICE 2,396,712

FILTER STRUCTURE AND METHOD OF MAKING IT

William G. Luttge, Brooklyn, and Emmanuel G. Mesthene, Woodside, N. Y., assignors to American Viscose Corporation, Wilmington, Del., a corporation of Delaware Application August 15, 1942, Serial No. 454,942

4 Claims. (Cl. 210—204)

This invention relates to filter structures comprising a filtering body and a covering therefor and is more particularly concerned with an improved form of covering and novel methods of assembling the covering with the filter body.

In the following description of the invention, reference will be made to the drawing in which:

Figure 1 is a perspective view of one form of filter embodying the invention,

Figures 2 to 5 inclusive illustrate successive steps of one process of assembling a covering with a filter body, Figure 6 is illustrative of an alternative method of assembling a covering with a filter body, Figure 7 is a detail view of a clamping device used in connection with the procedure of Figure 6, and Figure 8 shows the filter structure arranged in a housing for actual operation.

Generally, the filter structures of this invention are provided with a fabric covering made from textile fabrics comprising yarns or threads of a stretched thermoplastic filamentary material. Filaments made from thermoplastic materials and which have been stretched either during manufacture or subsequently thereto while in a cold unsoftened state or while in a somewhat softened and plastic condition, the stretching being performed in such a manner that the filaments are permanently extended, have the property of shrinking when subsequently rendered plastic by heating or softening agents. When fabrics comprising such stretched thermoplastic filaments are brought into an incipient plastic condition by heating or the application of suitable softening agents, the shrinkage that occurs is accompanied by more or less coalescence or fusion of the filaments to one another thus resulting in a somewhat stiffened fabric. These associated characteristics adapt in a special manner the covering fabric of the invention for assembly with various types of filtering bodies and also impart to the final products certain desirable properties not heretofore found in prior art filters.

The filaments may be made of any thermoplastic material. Filaments made of a vinyl resin, such as polyvinyl chlorides, the copolymers of polyvinyl chloride and polyvinyl acetate, and the after-chlorinated products such as are obtainable from the halogenation of polyvinyl chlorides or the copolymers of polyvinyl chloride with polyvinyl acetate are of particular interest where inertness to corrosive chemicals which may be present in the mass to be filtered is essential. Other thermoplastic resins may be used and filaments of other thermoplastic materials, particularly such cellulose organic derivatives as the cellulose esters and ethers, for example, cellulose acetate and ethyl cellulose, may be used in making the covering fabric of the invention. The fabric of which the covering is composed may be knitted or woven of single-filament or multi-filament or plied yarns.

Briefly, the filter structures of the invention are composed of a filtering body about which the covering fabric is preferably shrunk in place. The shrinkage is preferably effected by heating a seamless tube of the fabric into which a filter body is inserted. The shrinkage is accompanied by a certain amount of fusion which imparts certain desirable properties in the product which will be more fully pointed out hereinafter. The filtering body may be of any conventional character, such as of a wound fibrous material, a wound gimp material, or any porous body such as chamois, stone or ceramic ware.

The illustrative filter shown in Figure 1 comprises a central supporting core 2 of woven wire upon which soft cotton yarn is cross-wound in a manner to form diamond shaped interstices which are staggered in the successive layers of the winding to produce a rather dense filtering body 3. About the wound filtering body 3, there is provided the fabric covering 4 formed of the stretched thermoplastic filaments, the unit being preferably assembled in a manner now to be described.

Referring particularly to the sequence of steps shown in Figures 2 to 5, the first step shown in Figure 2 involves the insertion of the filtering body 3 within a cylindrical fabric 4 having a somewhat larger diameter than the outside diameter of the filtering body. The ends 5 of the fabric are folded over the ends of the filtering body 3 and tucked into the hollow space within the filtering body as shown in Figure 3. The ends of the filtering body may then be plugged as in Figure 4 where the plug shown is in the form of an ordinary rubber stopper 6 mounted upon a rod which may be in turn provided with a support 7. The filtering structure thus mounted may then be subjected in a suitable enclosure to heat or other softening agent. As a result of this step, the fabric shrinks down tightly against the circumference of the filtering body and the ends shrink to conform substantially to the end surfaces of the filtering body as shown in Figure 5.

In Figure 6 a modification of one of the steps in the procedure corresponding to that of Figure 4 is shown in which a plurality of the filtering bodies 3 are placed upon a common rod 8, a single tubular sleeve 9 of the fabric is slipped over the entire length of filtering bodies on the rod, flexible metal clamps 10 (more particularly shown in Figure 7) are wrapped about the tubular fabric between adjacent filtering bodies in a manner to draw the covering fabric about the ends of the filtering bodies and preferably sufficiently tightly to permit the clamp 10 to fit snugly within the hollow cores of the adjacent filtering bodies which may then be forced together with the clamps partially inserted into the ends of the adjacent filtering bodies to act as plugs. The loaded rods may then be subjected to heat in a chamber. After the shrinkage, the various filtering bodies may be somewhat separated, the clamps removed, and the "sausage links" severed by cutting the connecting fabric. The surplus fabric corresponding to that put into the hollow ends of the filtering body may be cut away to any extent desired to finish the filtering body.

The fineness of the openings in the mesh of the covering fabric on the finished product may be controlled by initially selecting or predetermining any one or more of several factors. In the first place, one may control this property in the final product by selecting a fine or coarse mesh fabric to begin with. Secondly, the relation between the diameter of the filtering body and the diameter of the covering fabric at the time it is first placed upon the body may be varied so that various degrees of fineness of the mesh in the final product may be obtained. For example, the larger the diameter of the tubular fabric used for a given diameter of filtering body, the greater the amount of shrinkage that is necessary to bring the fabric tightly into place against the outside surface of the body and consequently the smaller will be the openings for a given mesh of the initial fabric.

Figure 8 is illustrative of the manner of using the filtering body shown in Figure 1. As there shown, a casing is provided with a base plate 11 upon which the filtering body is firmly held by the main body 12 of the casing, the roof 13 of which firmly bears against the upper end of the filtering body and seals it against the passage of liquid. A channel 14 is provided for introducing the slurry into the casing and an outlet channel 15 is provided in alignment with the hollow interior of the filtering body 3.

Filtering bodies provided with the improved covering of the invention are characterized by numerous advantages. The fused surface of the fabric resulting from the shrinkage procedure is extremely smooth in character so that the chances of particles becoming mechanically caught in the covering fabric itself is greatly diminished. The result is that there is greater opportunity for the heavier particles to slide off the covering fabric to a point outside the sphere of the filtering action so that they can no longer interfere with the filtering action. In addition, the fabric is relatively stiff as a result of the fusing which accompanies the shrinking action so that the external surface of the filtering body is of a relatively smooth uniform character free of indentation or at the worst having only slight indentations where the outside pressure exerted by the liquid being filtered tends to force the covering fabric into the interstices upon the outermost layer of cross-wound filtering material or, if filtering bodies of other materials are used, the indentations are similarly reduced where they would otherwise be formed, such as by forcing of the fabric between the windings of the gimped material. These properties of smoothness and lack of indentations impart a degree of self-cleaning characteristic to the product. In addition, they make the filter product more readily cleanable, such as by brushing the surface, and such cleaning is not accompanied by damage or displacement of the covering fabric. The incorporation of the improved covering fabric in filter structures is accompanied by simplifications in the methods of manufacture since no cement, clips, ties, or straps are needed to hold the covering in place. A seamless tube may be readily applied to the wound filtering bodies without disturbing the winding. Furthermore, the ability to control the mesh in the covering of the final product makes it possible to obtain products the surfaces of which present a wide range of qualities adaptable to a correspondingly large number of types of slurries.

While preferred embodiments of the invention have been disclosed, the description is intended to be illustrative only, and it is to be understood that changes and variations may be made without departing from the spirit and scope of the invention as defined by the appended claims.

We claim:

1. A filter structure comprising a filtering body of wound fibrous material and a fabric covering shrunk in place thereon comprising a thermoplastic filamentary material, the yarn of the fabric being at least partially coalesced to produce a relatively smooth surface thereon.

2. A filter structure comprising a filtering body of wound fibrous material and a fabric covering shrunk in place thereon comprising a filamentary material of a copolymer of vinyl acetate and vinyl chloride, the yarn of the fabric being at least partially coalesced to produce a relatively smooth surface thereon.

3. A filter structure comprising a tubular filtering body of wound fibrous material and a fabric covering shrunk in place thereon comprising a filamentary material of a copolymer of vinyl acetate and vinyl chloride, the yarns of the fabric being at least partially coalesced to produce a relatively smooth surface thereon.

4. In a method of covering both a lateral and a contiguous end surface of a tubular body with a foraminous fabric comprising stretched filamentary material of a copolymer of vinyl acetate and vinyl chloride, the steps of providing the body with a blank of the fabric loosely fitting said body, bending a portion of the blank loosely about the end surfaces to be covered, clamping any surplus fabric against the end of the hollow interior of the tubular body, and then heating to shrink the fabric into close-fitting engagement with the surface of the body.

WILLIAM G. LUTTGE.
EMMANUEL G. MESTHENE.